Feb. 14, 1961

E. SCHOEN 2,971,642

KEEPER AND IDENTIFICATION MEANS FOR MOUNTING ON SOUND TAPE AND FILM STRIP REELS

Filed May 1, 1959

INVENTOR.
EDWARD SCHOEN
BY David K. Kilgore
ATTORNEY

United States Patent Office 2,971,642

Patented Feb. 14, 1961

2,971,642

KEEPER AND IDENTIFICATION MEANS FOR MOUNTING ON SOUND TAPE AND FILM STRIP REELS

Edward Schoen, 2329 W. Broadway, Minneapolis, Minn.

Filed May 1, 1959, Ser. No. 810,358

3 Claims. (Cl. 206—53)

This invention relates broadly to a keeper for securing the free end portions of sound tapes or film strips wound on a reel, and more particularly to a combined keeper and subject identification means that is removably mounted on said reel when the same is in storage or removed from a transcriber or projector.

The principal object of this invention is to provide means whereby the free end portion of a sound tape or film strip is retained against inadvertent unwinding from the reel on which the same are wound.

A further object of this invention is to provide a combined keeper and identification means to secure the free end portion of a sound tape or film strip wound on a reel and whereby the subjects matter of said tapes or films may be identified.

A further object of this invention is to provide a keeper and identification means for sound tapes and film strips wound on reels, said keeper and identification means having a markable surface for inscribing visible indicia.

A further object of this invention is to provide a keeper and identification means of the class described embodying integral color indicia as further means for subjects identification.

A still further object of this invention is to provide a keeper and identification means that is readily applicable and/or removable from engagement with the side plates of a reel.

These and other objects of the invention will become apparent from the following specification and claims taken in conjunction with the accompanying drawing in which, like characters indicate like parts throughout the several views.

To the above end, generally stated, the invention consists of the following devices and combination of devices hereinafter described and defined in the claims.

Referring to the drawings.

Figure 1:
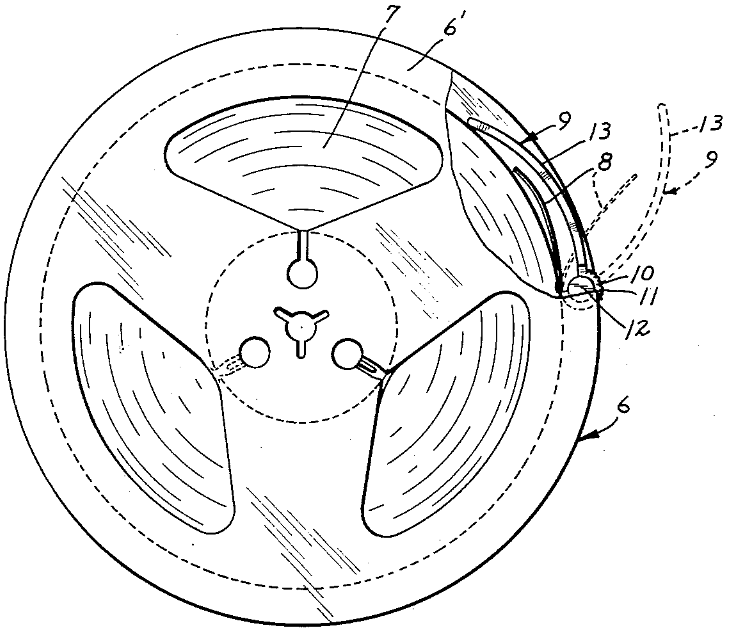
Fig. 1 is a side elevational view of a film or sound tape reel showing the invention mounted thereon.
Figure 2:
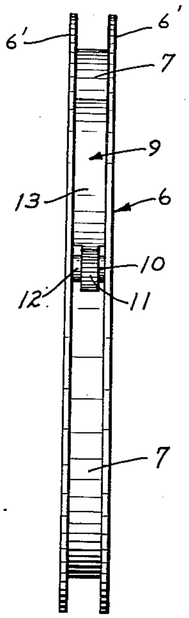
Fig. 2 is an end elevational view of the same.
Figure 3:
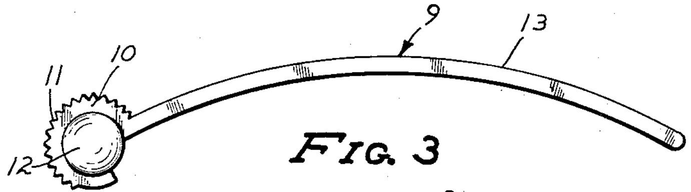
Fig. 3 is a side elevational view of the invention removed from the reel.
Figure 4:
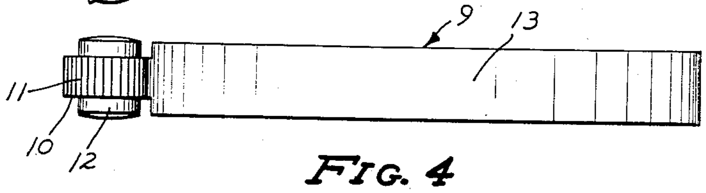
Fig. 4 is a top plan view of the same.

The reference character X identifies the invention as an entirety and the numeral 6 is directed broadly to a conventional reel having a pair of transversely spaced side plates 6' customarily used to retain a sound tape or film strip, said tape or film being identified on the drawing by the numeral 7 with its free end portion indicated by the numeral 8.

Referring to the invention proper, which is primarily intended to serve as a keeper X to prevent the inadvertent unwinding of the sound tape or film strip 7 from the reel, the numeral 9 indicates an elongated, longitudinally bowed body section, terminating at one of its rear end portions in a relative narrow split annular ring 10. This annular ring 10 affords a finger piece whereby the keeper may be manipulated as will presently be described. A plurality of transversely disposed serrations 11 are provided to facilitate movement of the keeper by affording a better purchase for the finger.

It is well to understand at this time that the keeper X described herein, will be furnished in a plurality of different widths of reels on which all standard sound tape and film sizes are wound.

The keeper X is detachably mounted on the reel 6 as shown, by means of a transversely disposed compressible member 12, preferably formed of rubber or a synthetic equivalent. This compressible member 12 is of slightly greater width than the elongated body section 9 of the keeper X and is frictionally held mounted transversely thereof in the annular ring 10.

This compressible member 12 being of slightly greater width than the elongated body section 9 of the keeper X will similarly also be very slightly wider than the distance between the inside surfaces of the transversely spaced side plates 6' of the reel 6. Therefore it will be understood that to mount the keeper X on the reel 6 it is only necessary to press the same between the side plates 6' of the reel 6 with the exposed end portion of the compressible member 12 engaging the inner, opposed surfaces of the said side plates and being frictionally held so positioned. Obviously the elongated body section 9 of the keeper X may point in either direction however as shown best in Fig. 1, the same is pointed in the same direction as the free end portion 8 of the sound tape or film strip. To secure the said tape or film it is only necessary to press the keeper unit X inwardly between the side plates 6' of the reel 6 until it engages the same as best shown in Fig. 1. As an alternative means for mounting the keeper X on the reel 6 the compressible member may be pressed inwardly between the side plates 6' only to such depth as to permit the serrations 11 to project slightly above the periphery of the reel. By so mounting the keeper X, the unit may be pivoted about the horizontal axis of the compressible member 12 having frictional engagement with the side plates 6' by finger or thumb manipulation of the annular ring 10 and the serrations 11 thereon, see dotted position Fig. 1. When the keeper is so mounted it will be obvious that only the elongated body section 9 of the keeper X may engage the sound tape or film strip to prevent the unwinding of the same from the reel 6.

Figure 5:
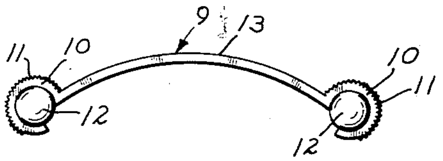
Fig. 5 is a view similar to Fig. 3 embodying a modification thereof.

A modified version of the keeper X is illustrated in Fig. 5 and embodies the principal of using an annular ring 10 at both ends of the elongated body section 9, said annular rings 10 each being provided with transversely disposed compressible members 12. Obviously, when in use, this modified form of the invention is pressed inwardly between the side plates 6' of the reel 6 in a position to overlie or straddle the free end portion of the sound tape or film strip to prevent the same from unwinding from the reel 6; with both end portions of the keeper X preferably in engagement with the said tape or film.

It has been stated that the instant invention is primarily a keeper but in addition to this primary function, it may serve well as a means to identify the subjects matter of the reel of sound tape or film to which it is applied.

To accomplish this end the upper surface 13 is finished to provide a markable surface to which pencil lines may be applied or erased therefrom to thus identify the subjects matter of the sound tape or fim strip 7 on the reel 6 to which the keeper X may be applied. It will be understood that the surface 13 will also accept small printed labels adhesively applied thereto.

It is also possible to provide further identifying means via the keeper X by establishing a color code to identify subjects matter or the like by employing compressible members 12 having different colors, said color identification being instantly readable by reference to the exposed end portion of said compressible members.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A keeper for retaining the free end portions of sound tapes, film strips, and the like wound on storage reels having transversely spaced side plates comprising in combination, a longitudinally bowed elongated body section terminating at one of its end portions in an annular split ring, a compressible member of greater width transversely, than the width of the elongated body section, said compressible member being mounted and frictionally held in said annular ring, the outer end portions of the compressible member being transversely extended beyond its mounting ring for frictional engagement with the side plates and a markable surface on the elongated body section.

2. The structure defined in claim 1 further including a plurality of serrations circumferentially disposed about the annular ring to facilitate rotation of the mounted keeper on the reel about the pivot point of the keeper formed by the endwise engagement of the compressible member and the interior surfaces of the side plates of the reel.

3. The structure defined in claim 1 further including an annular ring having circumferential serrations and a compressible member transversely mounted in each end portion of the elongated body section of the keeper.

References Cited in the file of this patent

UNITED STATES PATENTS

| | | |
|---|---|---|
| 749,971 | Nordhoff | Jan. 19, 1904 |
| 1,901,949 | Clark | Mar. 21, 1933 |
| 1,933,659 | Curran | Nov. 7, 1933 |
| 1,974,160 | Peirson | Sept. 18, 1934 |
| 2,174,049 | Werner | Sept. 26, 1939 |